United States Patent
Washburn et al.

(10) Patent No.: US 12,393,812 B2
(45) Date of Patent: Aug. 19, 2025

(54) ACTIVATION MECHANISMS FOR TRACKING TAGS

(71) Applicant: X Development LLC, Mountain View, CA (US)

(72) Inventors: Shane Washburn, Oakland, CA (US); Jonathan Wilfong, San Mateo, CA (US); Kin Seto, San Carlos, CA (US); Haden Cory, San Francisco, CA (US); Phillip Yee, San Francisco, CA (US); Ricky Yik Hei Ngan, Mountain View, CA (US); Dean Kawaguchi, San Jose, CA (US); Russell Shikami, Cupertino, CA (US)

(73) Assignee: CHORUSVIEW, INC., Las Vegas, NV (US)

( * ) Notice: Subject to any disclaimer, the term of this patent is extended or adjusted under 35 U.S.C. 154(b) by 0 days.

(21) Appl. No.: 18/235,123

(22) Filed: Aug. 17, 2023

(65) Prior Publication Data
US 2024/0070427 A1     Feb. 29, 2024

Related U.S. Application Data

(60) Provisional application No. 63/446,375, filed on Feb. 17, 2023, provisional application No. 63/400,891, filed on Aug. 25, 2022.

(51) Int. Cl.
*G06K 19/077*     (2006.01)
*G01S 1/68*     (2006.01)
(Continued)

(52) U.S. Cl.
CPC .......... *G06K 19/07722* (2013.01); *G01S 1/68* (2013.01); *G06K 19/0702* (2013.01);
(Continued)

(58) Field of Classification Search
CPC ........ G06K 19/07722; G06K 19/0702; G06K 19/0715; G06K 19/0772; G06K 19/0776;
(Continued)

(56) References Cited

U.S. PATENT DOCUMENTS 8,600,374 B1    12/2013   Hertlein et al.
8,672,362 B1    3/2014   Holt et al.
(Continued)

FOREIGN PATENT DOCUMENTS

KR      101005110 B1    12/2010
WO    2009052455 A1    4/2009
(Continued)

OTHER PUBLICATIONS

International Search Report and Written Opinion for corresponding International Application No. PCT/US2023/030554 dated Nov. 29, 2023 (8 pages).
(Continued)

*Primary Examiner* — Tuyen K Vo
(74) *Attorney, Agent, or Firm* — Botos Churchill IP Law LLP

(57) ABSTRACT

Aspects of the disclosure provide systems including liner material and tracking tags. A first tracking tag may be at least initially arranged on the liner material. The first tracking tag may also include beacon transmission circuitry including one or more batteries, a top layer, a bottom layer including an adhesive, and an activation mechanism. The activation mechanism may be configured to activate the first tracking tag and cause the beacon transmission circuitry to transmit beacon signals in order to enable tracking of the object. The activation mechanism may further include an initially closed circuit that extends beyond a perimeter of the top layer, and the activation mechanism may be configured to automati-
(Continued)

cally activate the tracking tag when the tracking tag is separated from an adjacent tracking tag on the liner material.

18 Claims, 14 Drawing Sheets

(51) Int. Cl.
- *G06K 19/07* (2006.01)
- *H04W 4/029* (2018.01)
- *G06K 19/06* (2006.01)

(52) U.S. Cl.
CPC ..... *G06K 19/0715* (2013.01); *G06K 19/0772* (2013.01); *G06K 19/0776* (2013.01); *H04W 4/029* (2018.02); *G06K 2019/06253* (2013.01)

(58) Field of Classification Search
CPC ........... G06K 2019/06253; G01S 1/68; H04W 4/029
See application file for complete search history.

(56) References Cited

U.S. PATENT DOCUMENTS

| | | | |
|---|---|---|---|
| 8,847,754 | B2 | 9/2014 | Buchheim et al. |
| 10,849,501 | B2 | 12/2020 | Gannon et al. |
| 10,964,197 | B2* | 3/2021 | Krejcarek ............... H04W 4/80 |
| 11,126,901 | B2 | 9/2021 | Badri et al. |
| 11,232,390 | B1 | 1/2022 | Leung et al. |
| 11,527,148 | B1* | 12/2022 | Volkerink ............... G08B 25/10 |
| 2006/0125691 | A1 | 6/2006 | Menache et al. |
| 2006/0147792 | A1 | 7/2006 | Guindy et al. |
| 2008/0146958 | A1 | 6/2008 | Guillory et al. |
| 2010/0234700 | A1 | 9/2010 | Bowers |
| 2012/0161967 | A1 | 6/2012 | Stern |
| 2013/0006326 | A1 | 1/2013 | Ackermann et al. |
| 2013/0030257 | A1 | 1/2013 | Nakata et al. |
| 2013/0127599 | A1 | 5/2013 | Foster et al. |
| 2014/0284356 | A1* | 9/2014 | Su ....................... B05C 17/0308 222/386 |
| 2015/0123765 | A1* | 5/2015 | Foster .................... G08C 17/02 340/5.61 |
| 2017/0220074 | A1 | 8/2017 | Cooper et al. |
| 2018/0172798 | A1* | 6/2018 | Lilly ..................... G01S 13/767 |
| 2018/0253632 | A1* | 9/2018 | Uland ................... H01L 23/544 |
| 2020/0140163 | A1* | 5/2020 | Novak ................. B65D 55/028 |
| 2020/0187349 | A1 | 6/2020 | Lee et al. |
| 2020/0200892 | A1 | 6/2020 | Rajab et al. |
| 2020/0272986 | A1 | 8/2020 | Bandil et al. |
| 2020/0364523 | A1 | 11/2020 | Badri et al. |
| 2021/0335488 | A1 | 10/2021 | Higginson |
| 2021/0383724 | A1* | 12/2021 | Hofenauer ............... G09F 3/10 |
| 2022/0004834 | A1 | 1/2022 | Perkins et al. |
| 2022/0027698 | A1 | 1/2022 | Volkerink |
| 2022/0225601 | A1 | 7/2022 | Manhas et al. |
| 2023/0004773 | A1* | 1/2023 | Kuechenthal .... G06K 19/07726 |
| 2023/0165524 | A1 | 6/2023 | Larson |
| 2023/0196267 | A1* | 6/2023 | Leung ................. H01M 10/425 705/333 |
| 2023/0342569 | A1 | 10/2023 | Koprowski et al. |
| 2023/0394257 | A1 | 12/2023 | Andre et al. |
| 2024/0281633 | A1 | 8/2024 | Larose |
| 2024/0311060 | A1 | 9/2024 | Wakabayashi |

FOREIGN PATENT DOCUMENTS

| | | | | |
|---|---|---|---|---|
| WO | | 2014160372 A1 | 10/2014 | |
| WO | WO-2019055161 A1 | * | 3/2019 | ......... G06K 19/0723 |
| WO | | 2020214758 A1 | 10/2020 | |

OTHER PUBLICATIONS

I6 Ultra-thin Tag, Thin Than You Think, Minew, downloaded from the internet on Aug. 18, 2022, url: https://www.minew.com/product/i6-ultra-thin-tag/.

International Search Report and Written Opinion for corresponding International Application No. PCT/US2023/030546 dated Dec. 4, 2023 (10 pages).

Li, "Accurate battery pack modeling for automotive applications" (Year: 2013).

\* cited by examiner

100

200

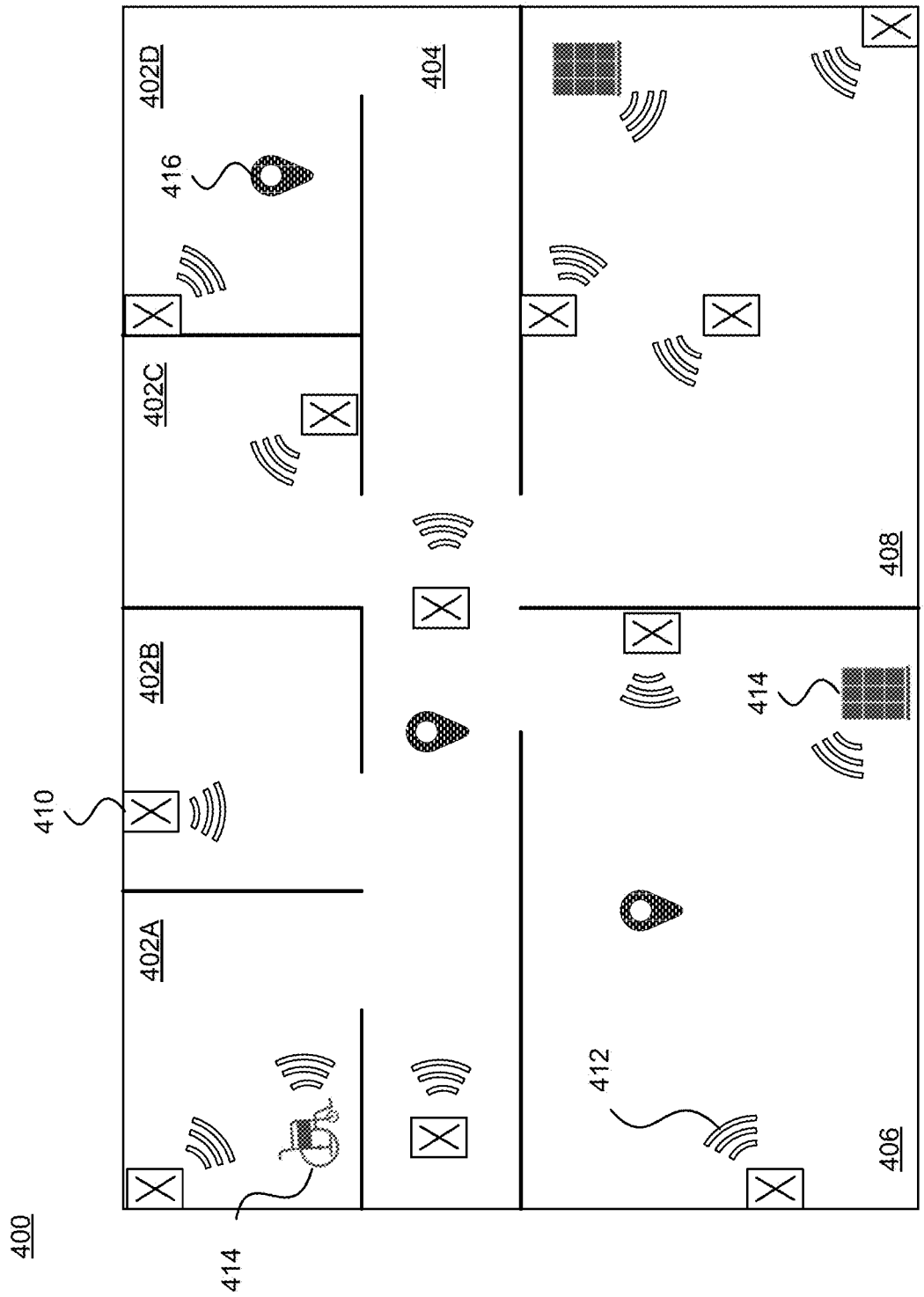

420

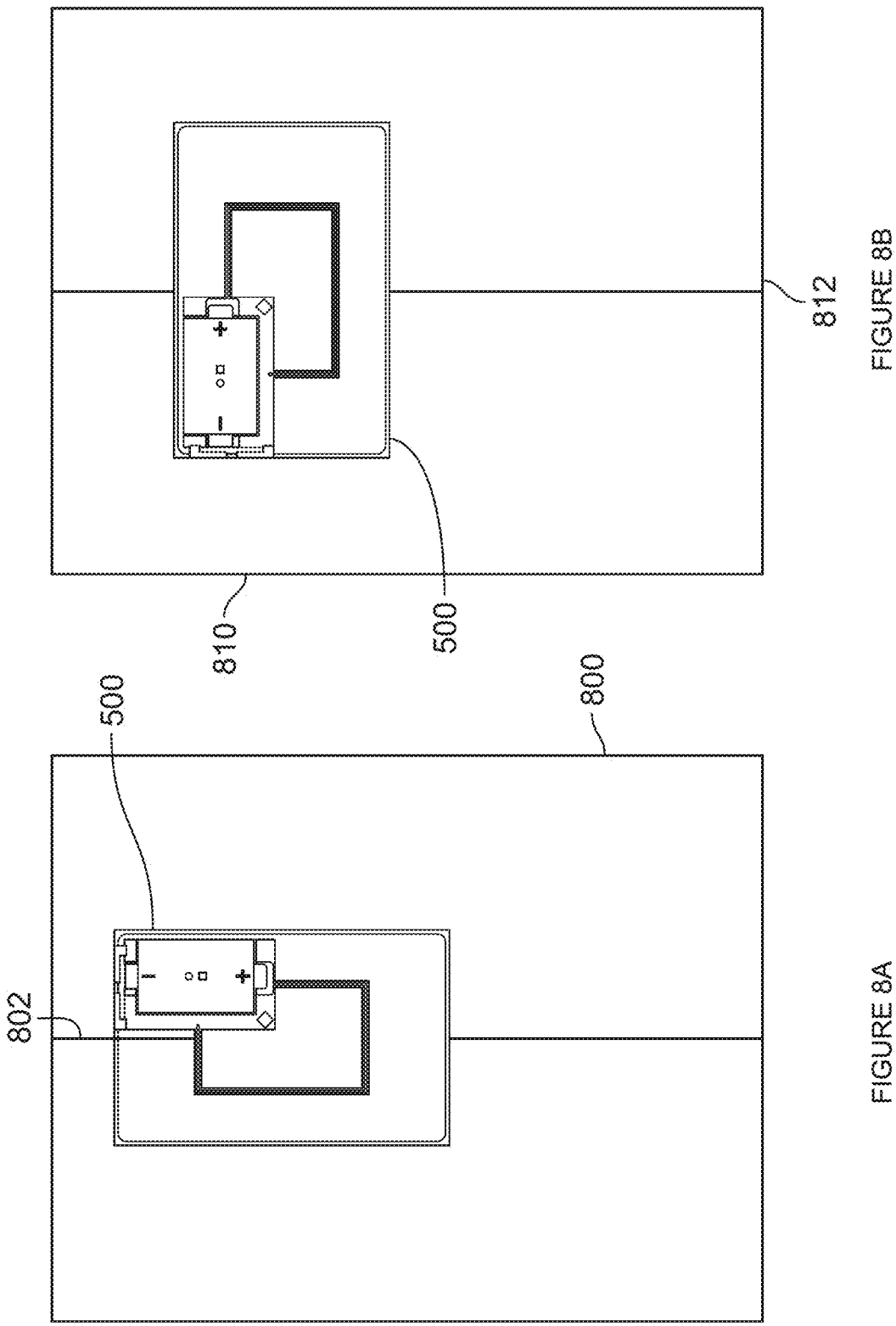

ACTIVATION MECHANISMS FOR TRACKING TAGS

CROSS-REFERENCE TO RELATED APPLICATIONS

The present application claims the benefit of the filing date of U.S. Provisional Application No. 63/446,375, filed Feb. 17, 2023 and U.S. Provisional Application No. 63/400,891, filed Aug. 25, 2022, the entire disclosures of which are incorporated by reference herein.

BACKGROUND

The Internet of Things (IoT) is the inter-networking of physical objects, such as products, packages, vehicles, buildings, etc., that are embedded with electronic components for network connectivity. The embedded components enable objects to detect others, be detected by others, collect data and/or transmit data. In some examples, the embedded components may include tags or labels attached to the physical objects. These tags or labels may be passive or active. The inter-networking capabilities may be leveraged for tracking locations of physical objects. In many situations, objects may be moved at different points in time, such as a package or equipment moved from a truck to a loading dock to a warehouse, or medical equipment that is moved between different rooms (or floors) in a hospital. These types of situations can be very challenging to determine the location of the object with suitable accuracy, including updating of the location as it changes. In addition, systems that use GPS or WiFi may suffer from signal dropout or transmitters going offline, which can reduce the ability to properly identify an object's location.

BRIEF SUMMARY

Aspects of the disclosure provide a system comprising. The system includes liner material, and a first tracking tag at least initially arranged on the liner material. The tracking tag includes beacon transmission circuitry including one or more batteries, a top layer, a bottom layer including an adhesive, and an activation mechanism configured to activate the tracking tag and cause the beacon transmission circuitry to transmit beacon signals in order to enable tracking of an object. The activation mechanism includes an initially closed circuit that extends beyond a perimeter of the top layer, and the activation mechanism is configured to automatically activate the tracking tag when the tracking tag is separated from a second tracking tag also arranged on the liner material.

In one example, the initially closed circuit includes a conductive material including a copper foil tape. In addition, the copper foil tape is at least 3 millimeters in width. In addition or alternatively, the copper foil tape is perforated. In addition or alternatively, the initially closed circuit connects the one or more batteries to a processor configured to activate the beacon transmission circuitry when the initially closed circuit is broken. In addition or alternatively, the initially closed circuit is configured such that breaking the initially closed circuit activates the tracking tag and causes the beacon transmission circuitry to transmit the beacon signals. In addition or alternatively, the second tracking tag, and wherein the initially closed circuit is arranged at least partially between the second bottom layer and the liner material. In addition, the initially closed circuit is configured such that removing the first tracking tag from the liner material causes the initially closed circuit to be broken, and wherein a portion of the initially closed circuit remains attached to the second tracking tag. In addition or alternatively, the first tracking tag further includes a deactivation circuit configured to deactivate the beacon transmission circuitry when the deactivation circuit is cut. In addition, the first tracking tag further includes guidelines on the top layer for aligning the first tracking tag with an opening of a package, and wherein the guidelines are arranged such that by cutting along the guidelines will cut the deactivation circuit. In addition or alternatively, the system also includes the second tracking tag, and the first tracking tag is configured to be separated from the second tracking tag by cutting, tearing or ripping the liner material between the first tracking tag and the second tracking tag. In addition or alternatively, the system also includes the second tracking tag, and the first tracking tag is configured to be separated from the second tracking tag by peeling the first tracking tag away from the liner material.

Another aspect of the disclosure provides a method for activating a first tracking tag arranged on a liner material. The method includes removing the first tracking tag from a second tracking tag on the liner material. Separating the first tracking tag from the second tracking tag causes an initially closed circuit of the first tracking tag to be broken thereby activating beacon transmission circuitry of the first tracking tag to generate beacon signals and a portion of the initially closed circuit remains attached to the second tracking tag.

In one example, the method also includes applying the first tracking tag to an object via an adhesive of the first tracking tag, wherein application of the first tracking tag to the object enables tracking of the object via the beacon signals. In addition or alternatively, the portion of the initially closed circuit extends beyond a perimeter of a top layer of the first tacking tag, such that separating the first tracking tag from the second tracking tag results in the portion of the initially closed circuit remaining attached to the liner material. In addition or alternatively, the portion remains attached to the liner material between the second tracking tag and the liner material. In addition or alternatively, the initially closed circuit includes a conductive material including copper foil tape that is broken upon removal of the first tracking tag from the liner material. In addition or alternatively, the initially closed circuit connects one or more batteries of the first tracking tag to a processor of the first tracking tag, and wherein separating the first tracking tag from the second tracking tag enables the one or more batteries to power the processor. In addition or alternatively, the first tracking tag further includes a deactivation circuit, and wherein the method further includes deactivating the beacon transmission circuitry by cutting or otherwise breaking the deactivation circuit. In addition or alternatively, the method also includes applying the first tracking tag to a package using guidelines on a top layer of the first tracking tag to align the first tracking tag with an opening of the package. In addition or alternatively, deactivating the beacon transmission circuitry includes cutting open the package. In addition or alternatively, cutting or otherwise breaking the deactivation circuit causes a signal to be sent to a processor of the first tracking tag which, in turn, causes the processor to send a signal to the beacon transmission circuitry which causes the first tracking tag to cease transmitting the beacon signals.

BRIEF DESCRIPTION OF THE DRAWINGS

FIGS. 4A-B illustrate example scenarios in accordance with aspects of the disclosure.

FIGS. 8A-B are example views of tracking tags arranged on packages in accordance with aspects of the disclosure.

DETAILED DESCRIPTION

Overview

Figure 1A:
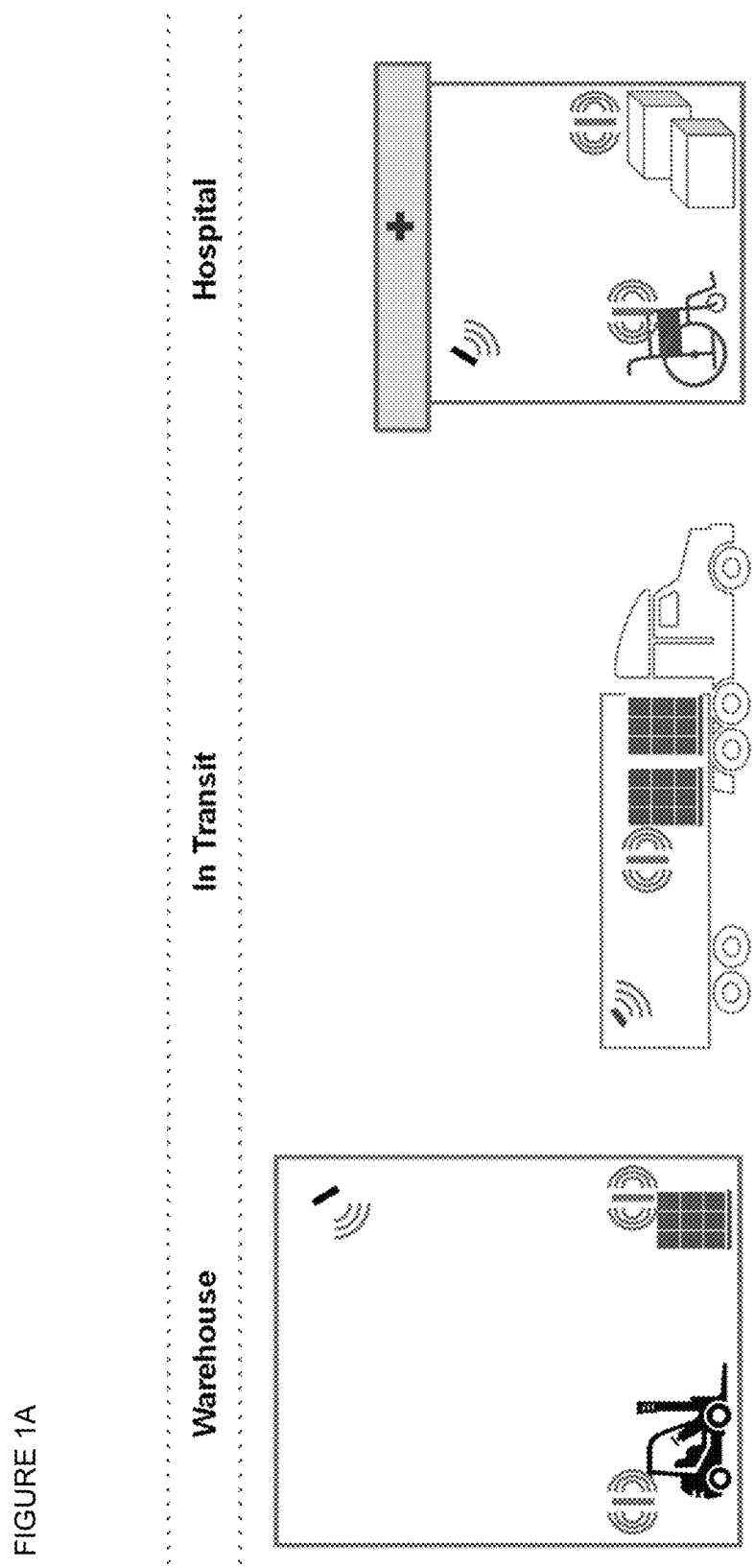
FIG. 1A illustrates various examples for localization of objects in accordance with aspects of the technology.

The technology relates to accurate localization and tracking of articles or other objects transported, for example, by logistics providers. In order to track such articles or other objects, tracking tags may be used. Such tracking tags may be active, configured to include a battery or be coupled to another power source. In the case of a battery, delaying activation of the battery until the end user is ready to use the tracking tag is critical to extending the useful life of the tracking tag.

In order to enable the use of the aforementioned tracking tags on as many different types of articles to be shipped and other objects as possible, the tracking tags may be designed to be both thin and flexible. In this regard, the tracking tags may be configured as adhesive shipping labels. In such instances, the tracking tags may be manufactured on a roll of liner material which allows the tracking tags to be printed. When in use, each tracking tag may be removed from (e.g. peeled off) of the roll of liner material and applied to an article to be shipped or another object by a human operator.

Each tracking tag may include various components such as a top layer for printing a label, a frame, beacon transmission circuitry, a bottom layer including an adhesive (for attaching the tracking tag to an article to be shipped or another object). The beacon transmission circuitry may include a printed circuit board (PCB) and one or more batteries. The PCB may include various features such as an identifier chip and/or a transmission device for the purposes of transmitting beacon signals.

The tracking tags may also include an activation mechanism configured to activate the tracking tag and initiate transmission of beacon signals by the beacon transmission circuitry. The initially closed circuit may connect to the battery and the processor in order to enable the processor to monitor the continuity of the closed circuit.

The initially closed circuit may be formed from a conductive material such as foil tape such as a copper foil tape or by using embedded traces and inlay technology such as etched aluminum on polyethylene terephthalate (PET). The conductive material may extend beyond a perimeter of a label of the tracking tag and may, at least before activation, be partially arranged under an adjacent tracking tag on the roll.

When the tracking tag is removed (e.g., peeled), from the liner paper of the roll, the continuity of the initially closed circuit is broken, activating the tracking tag and enabling the transmission of beacon signals which allow a tracking system to track the location of the tracking tag. This removal causes the tracking tag to be separated from both the liner material (e.g., a roll of liner material) as well as an adjacent tracking tag. In this regard, once a tracking tag is removed, a portion of the initially closed circuit, now no longer closed, may remain attached to the adjacent tracking tag.

In some instances, the tracking tag may include a deactivation circuit. For instance, the deactivation circuit may connect the battery. In this instance, when the deactivation circuit is broken, the tracking tag may be deactivated or rather, no longer be able to send the aforementioned beacon signals. In other instances, the deactivation circuit when cut may send a signal to a processor which indicates that the tracking process has ended. This, in turn, may cause the processor to send a signal causing the tracking tag to cease transmitting the beacon signals.

The features described herein may provide for a simple, cost effective and useful tracking tag which can be automatically activated without additional steps. For instance, logistics companies need not change existing shipping processes by adding additional steps in order to activate a tracking tag. Rather labels may be printed and applied to boxes or envelopes per usual and each tracking tag is automatically activated. Thus, the addition of the benefits of beacon-based tracking will not add additional labor costs. In addition, in many instances, this may prevent a human operator from inadvertently forgetting to activate a tracking tag.

Example Systems

FIG. 1A illustrates examples of different objects in various environments. As shown on the left side image of the figure, there may be packages or equipment on a pallet in a warehouse. The pallet may have come off of a cargo truck as shown by the "In Transit" image in the middle of the figure. The pallet may be moved to one or more different locations within a warehouse, such as by the forklift shown in the left side image. The right-side image in the figure illustrates a situation where medical equipment (e.g., a wheelchair) and supplies in boxes may be stored in a supply room in a hospital.

In all of these situations—in the warehouse, on the cargo truck, or at the hospital, the objects of interest may move around. That may be to a different aisle or room in the warehouse, a different room (or even a different floor) of the hospital, or different part of the cargo container of the truck. In the latter case, the cargo may have shifted during transit or may have been repositioned as different packages were delivered to different locations. Knowing where the objects of interest are currently located, as opposed to where they are presumed to be based on an initial placement, is a valuable piece of information for an office manager, warehouse manager, nurse or orderly to have. Ideally, such people should be able to get the current location of a given object on their client computing device such as a laptop, mobile phone or smartwatch.

Figure 1B:
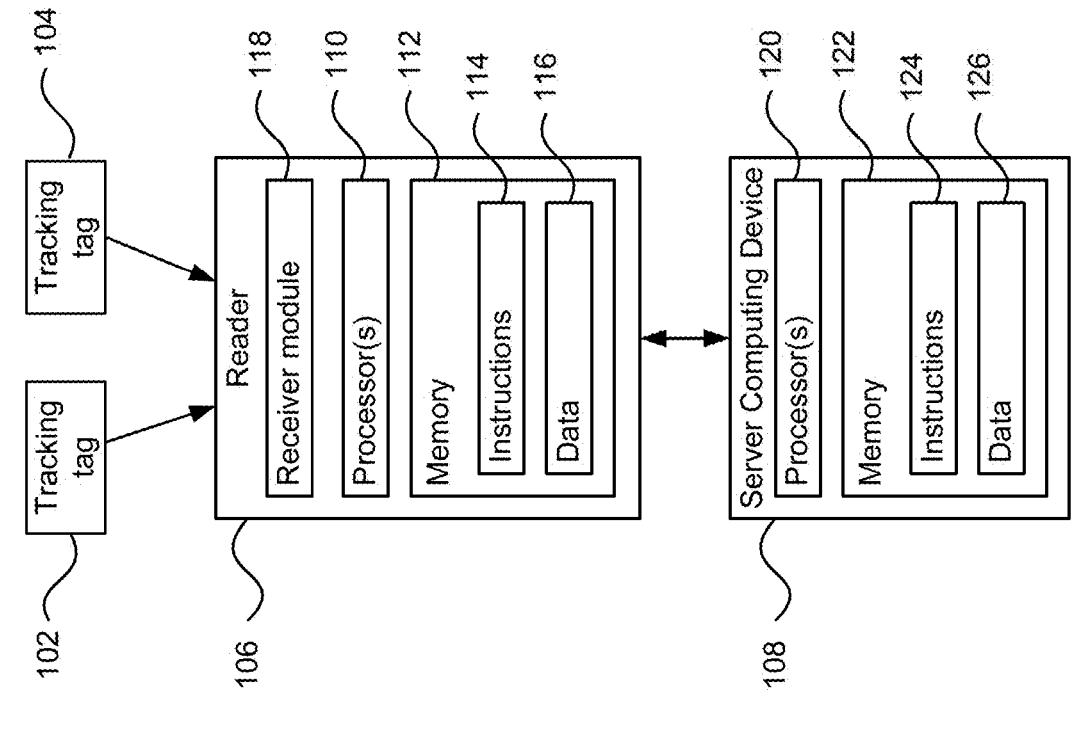
FIG. 1B is a functional diagram of an example tracking system in accordance with aspects of the disclosure.

FIG. 1B is a functional diagram of a tracking system 100. The tracking system 100 may include a plurality of tracking devices, such as tracking tags 102 and 104, and a reader 106. As discussed further below, one or more server computing devices 108 may also be part of the tracking system 100. A given tracking tag may be placed on or otherwise attached to or inserted into an object to be tracked, such as a package, a piece of equipment, a vehicle, a warehouse section, a room, etc. While tracking tags 102 may be associated with objects such as packages, equipment or vehicles (e.g., a forklift or an autonomous fulfillment robot that can retrieve packages from different locations in a warehouse), tracking tags 104 may be fixed to an aisle in a warehouse or from a specific room in a hospital. Thus, different tracking tags may be used depending upon customer needs. As an example, different customers may have varying accuracy and "liveliness" needs. For instance, one customer may only want to know aisle-level accuracy every day (e.g., before a warehouse closes for the evening), while another customer such as a hospital nurse may need to know which room a piece of equipment is in every hour so that it can be accessed should a patient need such equipment. Each tracking tag 102 or 104 may emit an informational signal, for example a beacon signal, via an antenna, such as using the transmitting device, to communicate data. In this regard, each tracking tag may include an identifier chip (such as for radiofrequency (RF) identification) and/or a transmitting device (such as an RF module configured to transmit beacon signals using a selected frequency band and transmission protocol). In this regard, the beacon signals may simply transmit identifying information in order to enable tracking of objects in the case of tracking tags discussed further below. To facilitate this, each tracking tag may be embedded with a unique identifier, such as a unique MAC address or BLUETOOTH identifier, which may function as a tracking tag identifier. This tracking tag identifier may be assigned to the tracking tag during the manufacturing or provisioning processes (described further below).

The transmitting device may send such information via radio frequency transmission in a selected frequency band, using a standard or proprietary protocol. By way of example, the transmitting device may employ a BLUETOOTH (e.g., a BLUETOOTH Low Energy (BLE)) or 802.11 protocol in the 2.4 GHz and/or 5 GHz frequency bands. In some examples, each beacon tracking tag and each tracking tag uses the BLUETOOTH or BLE protocol.

In some instances, the tracking tags may include one or more sensors. In such instances, the aforementioned communicated data may be formatted according to the selected protocol and include one or more sensed characteristics of the given tracking tag or its environment. For example, the sensed characteristic may be a temperature, a location, motion, battery conditions, trip conditions, and/or other detectable characteristics of the tracking devices or its environment.

The reader 106 may be a computing device configured to detect the beacon signals emitted by the plurality of tracking tags 102 and 104, then store and/or transmit data related to the tracking tags. While only one reader is shown in FIG. 1B, the system may employ multiple readers. The reader 106 may include one or more processors 110, memory 112 and other components typically present in general purpose computing devices. The reader 106 includes a receive module 118 having an antenna and a processing section (not shown), which may include a bandpass filter for the frequency band of interest, an analog to digital (A/D) converter, and a signal processing module to evaluate information in received beacon signals. The processing section may also convert the received beacon signal to a baseband signal, before or after A/D conversion.

The one or more processors 110 may be any conventional processors, such as commercially available CPUs or microcontrollers. Alternatively, the one or more processors may be a dedicated device such as an ASIC or other hardware-based processor, such as a field programmable gate array (FPGA). Although FIG. 1B functionally illustrates the one or more processors, memory, and other elements of the reader 106 as being within the same block, the processor, computing device, or memory may actually include multiple processors, computing devices, or memories that may or may not be stored within the same physical housing. For example, memory may be a hard drive, a removable USB drive or other storage media located in a housing different from that of the reader 106. Accordingly, references to a processor or computing device will be understood to include references to a collection of processors or computing devices or memories that may or may not operate in parallel.

The memory 112 stores information accessible by the one or more processors 110, including instructions 114 and data 116 that may be executed or otherwise used by the one or more processors 110. The data may include sensed characteristics from any of the tracking tags 102 and/or 104 received by the reader 106. The memory 112 may be of any type capable of storing information accessible by the one or more processors, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 116 may be retrieved, stored or modified by the one or more processors 110 in accordance with the instructions 114. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 114 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

In some implementations, the tracking system 100 may further include a central server, such as one or more server computing devices 108 accessible by the one or more processors 110 of the reader 106. In some implementations, one or more tracking devices in the tracking system 100, such as a tracking tag 104, may be configured to obtain and communicate data directly to the one or more server computing devices 108. The one or more server computing devices 108 may include one or more processors 120, memory 122 and other components typically present in general purpose computing devices. The one or more processors 120 may be the same or similar type as the one or more processors 110, and the memory 122 may be the same or similar type as the memory 112. The memory 122 stores information accessible by the one or more processors 120, including instructions 124 and data 126 that may be executed or otherwise used by the one or more processors 120. Data 126 and instructions 124 may be the same or similar type as the data 116 and instructions 114, respectively.

After detecting the beacon signals of one or more tracking tags 102 or 104, the reader 106 may transmit the data from the tracking tags to the one or more server computing devices 108 through an existing connection or through a network. Thus, in this case the reader 106 may include a transmitter module (not shown) that is configured for wired or wireless transmission to the server computing device. The data may be received in a series of payloads (e.g., data packets) either continually, at one or more set intervals, or ad hoc whenever the tracking tags transmit. Thus, when there are multiple tracking tags, the data is effectively received as a plurality of separate data streams. A given payload (which may comprise one or more data packets) may include measurements taken at one or more time intervals, each of which may have a corresponding timestamp. In one scenario, the reader 106 may include a transceiver including both a receiver and a transmitter, which is configured to receive beacon signals from the tracking tags 102 and 104 and also to send and receive information with the server computing devices 108.

The one or more server computing devices 108 may be configured to track characteristics of the tracking devices for one or more alerts based on a plurality of conditions. The plurality of conditions may include at least one condition for each characteristic, such as a minimum, a maximum, a threshold, a duration, or a geofence. The conditions may be predetermined or set based on user input. For example, a first alert may be set for when (1) a temperature is greater than, e.g., 0° C. to 11° C. for 30 minutes and (2) the tracking device is on a trip, which may indicate overheating of a cooled package or storage compartment. A second alert may be set for when (1) no motion is detected for 11 minutes, (2) 2 of 3 locations are in a geofence, and (3) the tracking device is on a trip, which may indicate that a package is out for delivery. A third alert may be set for when (1) a threshold amount of light is detected from inside a package and (2) the tracking device is on a trip, which may indicate unexpected opening of the package or tampering. A fourth alert may be set for when (1) a threshold amount of light is detected from inside a package and (2) 2 of 3 locations are in a destination geofence, which may indicate opening of the package after delivery or receipt. Many other alert conditions and tracking scenarios are possible, and the above examples are not intended to be limiting.

The tracking system 100 may optionally include an application that may be installed on one or more client computing devices. Using the application, the client computing devices may access the data from the reader 106 and/or the server computing devices 108 through a network.

Figure 2:
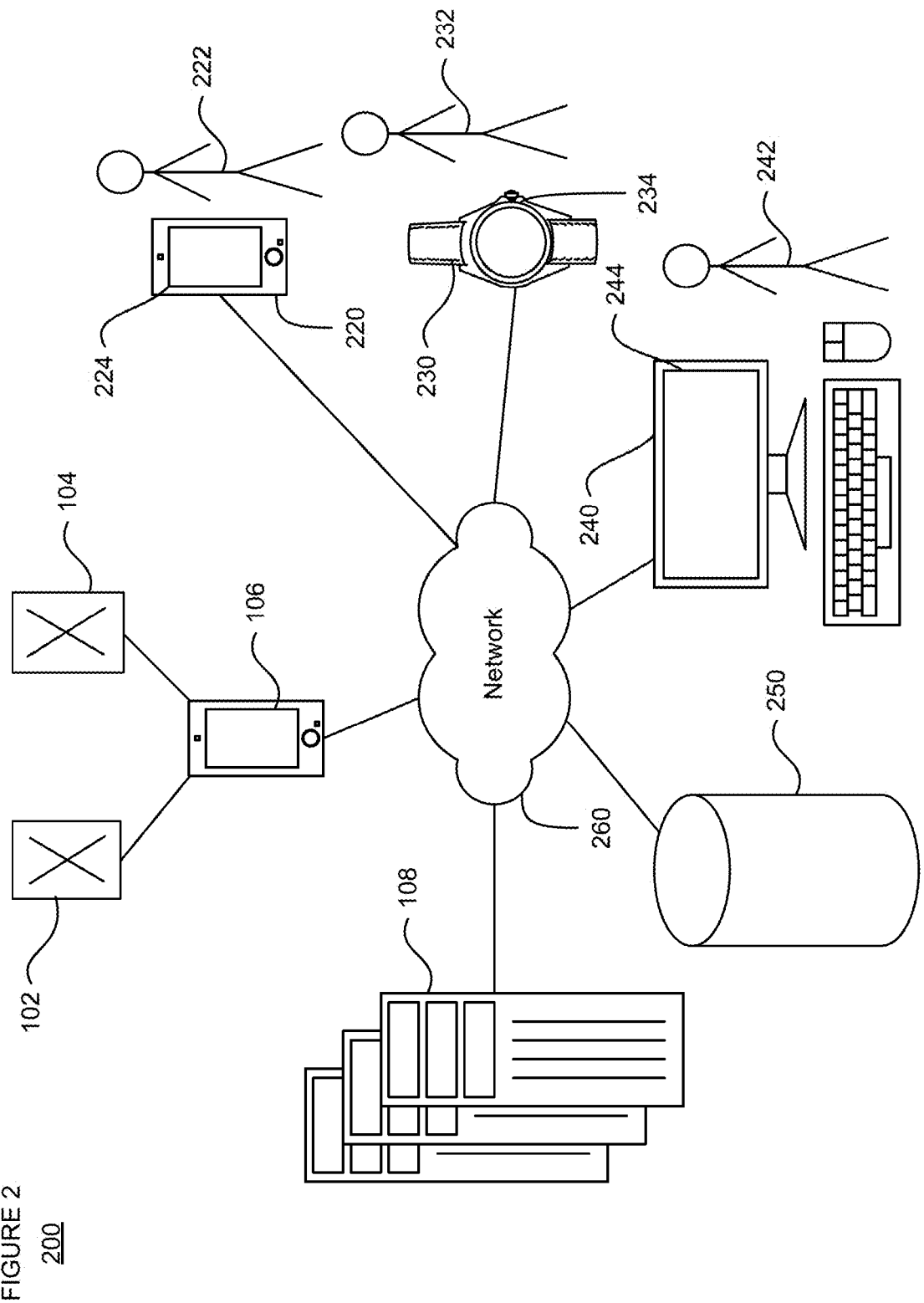
FIG. 2 is a pictorial diagram of an example network in accordance with aspects of the disclosure.
Figure 3:
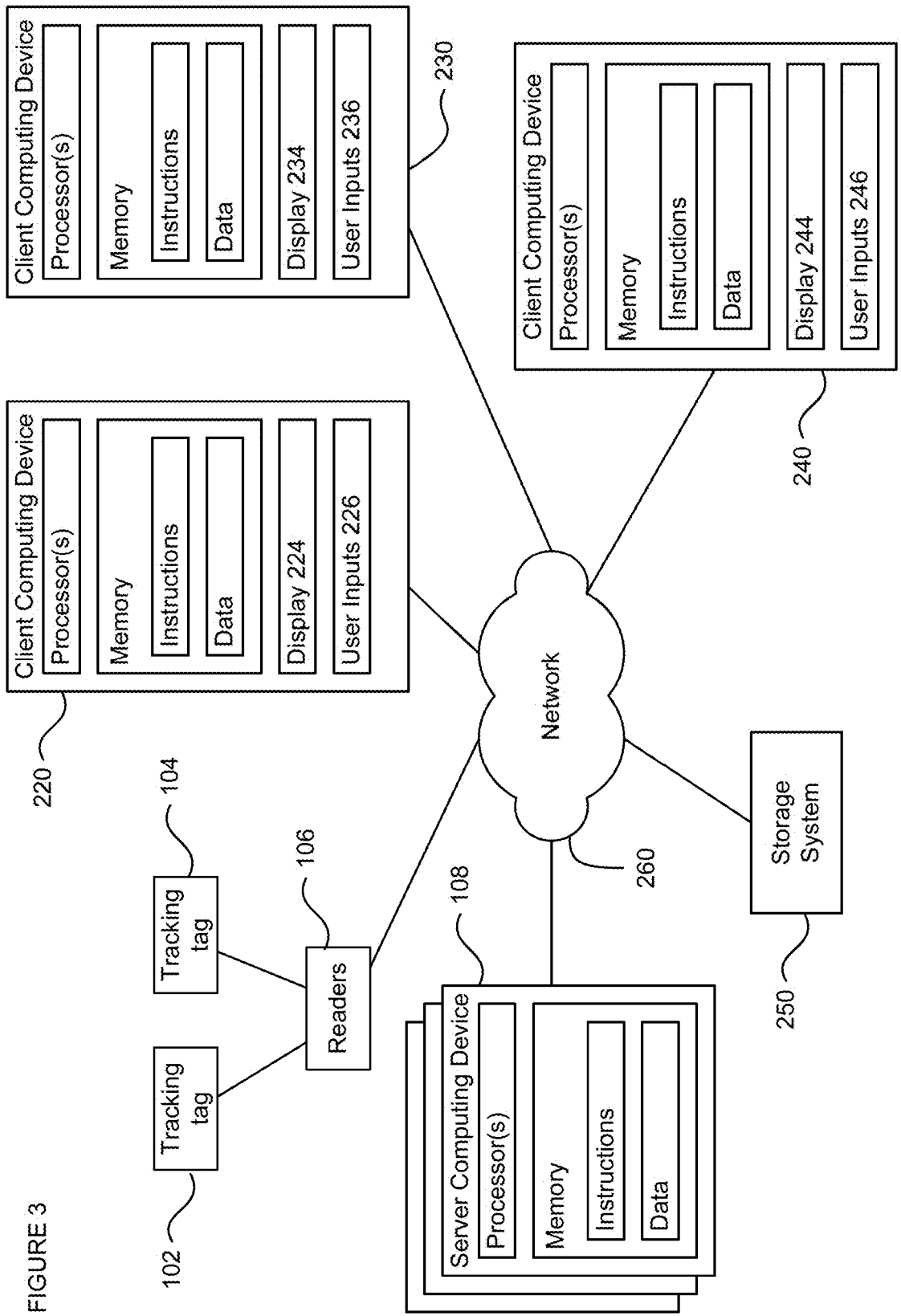
FIG. 3 is a functional diagram of the example network in FIG. 2 in accordance with aspects of the disclosure.

FIGS. 2 and 3 are pictorial and functional diagrams, respectively, of an example system 200 that includes a plurality of client computing devices 220, 230, 240 and a storage system 250 connected via a network 260. System 200 also includes tracking system 100, including tracking tags 102, 104, reader 106, and server computing device 118. Although only a few tags and computing devices are depicted for simplicity, a typical system may include significantly more.

Using the client computing devices, users, such as user 222, 232, 242, may view the location data on a display, such as displays 224, 234, 244 of respective client computing devices 220, 230, 240. As shown in FIG. 3, each client computing device 220, 230, 240 may be a personal computing device intended for use by a respective user and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a head-mounted display, a smartwatch display, a projector, a television, or other device that is operable to display information), and user input devices 226, 236, 246 (e.g., one or more of a mouse, keyboard, touch screen and/or a microphone). The client computing devices may also include speakers, a network interface device, and all of the components used for connecting these elements to one another.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system (e.g., a smartwatch or head-mounted display, or a netbook that is capable of obtaining information via the Internet or other networks. As an example, the user may input information using a small keyboard, a keypad, microphone, using visual signals (gestures) with a camera or other sensor, or a touch screen.

As with memory 112, storage system 250 can be of any type of computerized storage capable of storing information accessible by the one or more server computing devices 108, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2, and/or may be directly connected to or incorporated into any of the client computing devices 220, 230, 240. The storage system 250 may store information about the tracking tags including, for example, location, status (e.g., activated and when), identifiers, last update, sensor data (e.g., temperature measurements), information about the object to which the tracking tag is attached (e.g., manufacturing data), and so on. In this regard, the information may be determined from received beacon signals provided to and updated at the storage system 250 by any of the one or more server computing devices 108 and/or client computing devices 220, 230, 240.

FIG. 4A illustrates one example 400 of a system having a number of tracking tags arranged in various locations of a building (e.g., a hospital). In this example, there may be a number of rooms 402A-402D, such as patient rooms, along one side of a hallway 404. On the opposite side of the hallway 404 there is a storage room 406, such as to house equipment or supplies, as well as another room 408, which may be a meeting room, common area, rehab facility or the like. One or more fixed tracking tags 410 corresponding to the tracking tags 102 or 104 may be located in each room, including the hallway. Each fixed tracking tag 410 is configured to emit beacon signals 412 (e.g., RF signals in a selected frequency band according to a particular communication protocol). While the beacon signals 412 may appear directional, this need not be the case and the beacon signals may be transmitted omnidirectionally, for instance from a tracking tag 410 that is located on the ceiling, pillar or floor. In some implementations, the tracking tag 410 may be configured to emit beacon signals with information associated with its environment (e.g., temperature, humidity, etc.).

Tracking tags 414 may correspond to tracking tags 102 or 104 when placed on a variety of objects (e.g., a case of supplies as shown in storage room 406 or a wheelchair shown in room 402A). In some instances, the tracking tags may also be configured to emit beacon signals with information associated with the object on which the tracking tag is applied (e.g., temperature, motion information, object details, and/or other detectable characteristics of the tracking device or its environment). Readers 416 may be found at various locations in the building, such as in a patient room, the storage room, the hallway or other location. Note that even if transmitted omnidirectionally, the beacon signals from a given tracking tag may be attenuated in a non-uniform manner due to the presence of walls, furniture, floors/ceilings, equipment, etc.

Figure 4B:
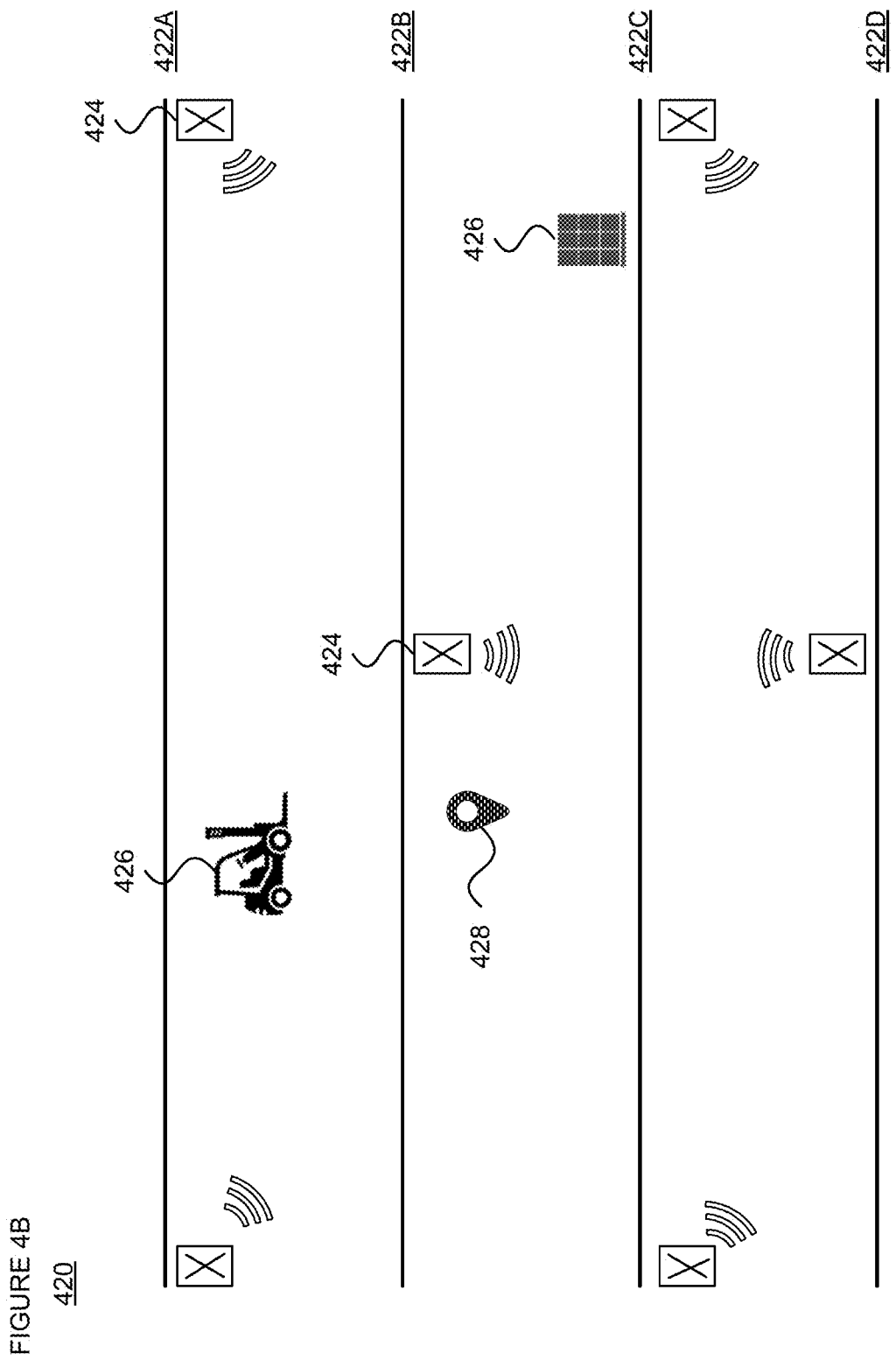

FIG. 4B illustrates another example 420 of a system having a number of fixed tracking tags positioned along different aisles in a warehouse setting. In this example, there are a number of aisles 422A-422D, although there may be more (or fewer) aisles, and the aisles may be arranged in other configurations than what is shown. Here, fixed tracking tags 424 are located at different places for the aisles, such as along aisle end caps, along the ceiling (or floor), on shelves, storage lockers, cabinets or other places along the aisle, etc. Similar to FIG. 4A, fixed tracking tags 426 are placed on or otherwise associated with different objects, such as a pallet of equipment or a forklift that retrieves items from their locations in the warehouse. As above, the fixed tracking tags are configured to transmit beacon signals that are detectable by one or more readers 428.

In order to determine the location of a given tracking tag, the system may use signal strength information obtained from the beacon signals of one or more tracking tags. A series of beacon signals may be ramped at different power levels (a ramped sequence). Evaluating the received beacon signals in view of their transmitted power can enable the system to determine which room or other location at which a given tracking tag is located. From that, the system is able to determine a location for a given tracking tag (and thus its corresponding object) with a suitable degree of certainty, such as by triangulating its position relative to the relevant tracking tags.

In order to enable the use of the aforementioned tracking tags on as many different types of objects and locations as possible, the tracking tags may be designed to be both thin and flexible. In addition, each tracking tag may be passive, such as a tracking tag configured to activate or be powered by environmental energy, or active, configured to include a battery or be coupled to another power source. In the case of a battery, delaying activation of the battery until the end user is ready to use the tracking tag is critical to extending the useful life of the tracking tag.

In order to enable the use of the aforementioned tracking tags on as many different types of articles to be shipped and other objects as possible, the tracking tags may be designed to be both thin and flexible. In this regard, the tracking tags may be configured as adhesive shipping labels (e.g., 4×6 shipping labels commonly used by logistics companies to ship packages such as envelopes, boxes, bags, etc.).

Figure 5A:
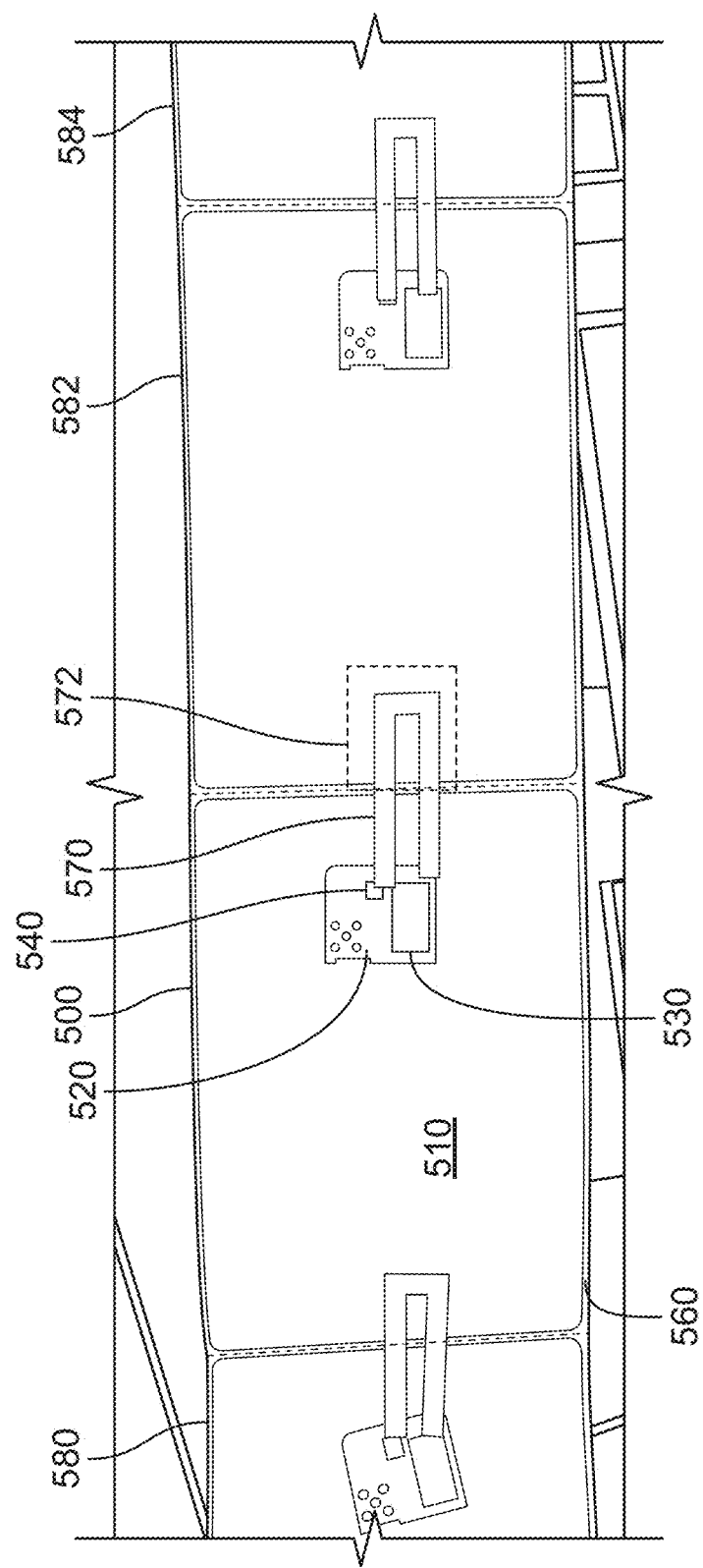
FIGS. 5A-D are example views of tracking tags in accordance with aspects of the disclosure.

Each tracking tag may include various components such as a top layer for printing a label, a frame, beacon transmission circuitry, a bottom layer including an adhesive (for attaching the tracking tag to an article to be shipped or another object). FIG. 5A is an example top-down, view of a plurality of tracking tags 500, 580, 582, 584 which may be configured the same as or similarly to any of the tracking tags 102, 104, 410, 414 described above. In this example, the tracking tag 500 includes a top layer 510 (partially transparent), beacon transmission circuitry 520, one or more batteries 530, a processor 540, and a bottom layer 550 below the top layer and beacon transmission circuitry. The bottom layer 550 is depicted in break-away view of FIG. 5B. Tracking tags 580, 582, 584 may be configured the same or similarly to tracking tag 500.

The top and bottom layers may provide impact protection, prevent the ingress of liquids and other contaminants, as well as provide a smooth surface for applying labels or on which to print information (whether or not an additional adhesive label is not used). The top layer 510 and bottom layer 550 may be a thin sheet (e.g., 0.1 mm) of polyester or paper each with an adhesive backing. In this regard, the top layer 510 may be pressed onto the bottom layer 550 with the beacon transmission circuitry 520, one or more batteries 530, and the processor 540 (and in some instances, a frame as discussed further below) therebetween. In this regard, the beacon transmission circuitry 520, one or more batteries 530, and processor 540 are arranged between the top layer and the bottom layer. In addition, the adhesive backing on the top layer may secure the top layer to the bottom layer, and the adhesive backing on the bottom layer may be used to attach the tracking tag to an object (e.g., a package). Alternatively, the bottom layer may include adhesive on opposing sides (e.g., a top side and a bottom side) of the bottom layer allowing for the attachment of the top layer onto the bottom layer without the additional adhesive. As noted above, the adhesive backing may include commercially available glues or double-sided tapes such as those provided by 3M including 3M Double Coated Tape 93015LE.

The top layer 510 may be configured to printed on during manufacturing and/or by the end user before application of the tracking tag on an object (e.g., a package, a wall, a shelf, etc.). For example, the end user may be able to print tracking and identifier information directly onto the top layer. Alternatively, the tracking and identifier information may be printed onto a separate label and apply applied to a surface (e.g., the top layer) of the tracking tag 500 when ready to use the tracking tag. Such labels may include proprietary labels or commercially available labels such as those provided by AVERY including the Avery Ultra Duty White Film 94211.

The beacon transmission circuitry 520 may include a printed circuit board (PCB) and one or more batteries. The PCB may include various features such as an identifier chip and/or a transmission device for the purposes of transmitting beacon signals. The PCB may be a commercially available PCB which can be connected to one or more batteries. For example, the PCB may include PCBs such as surface mount technology (SMT) PCBs including devices that enable BLUETOOTH LE 4.0 technology for the purposes of enabling the aforementioned beacon signals.

Figure 6B:
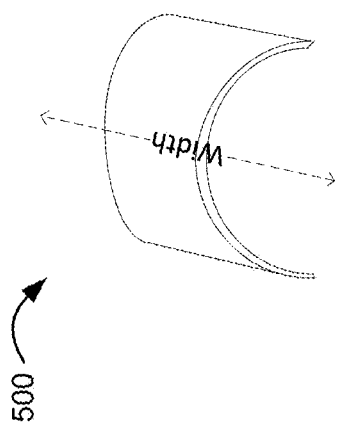
FIGS. 6A-B are example views of tracking tags in accordance with aspects of the disclosure.
Figure 6A:
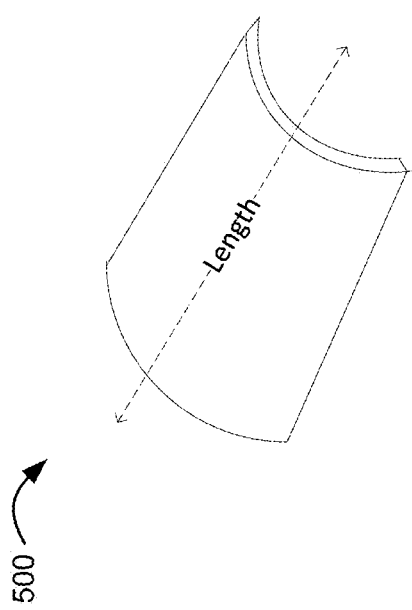

The one or more batteries 530 may be relatively thin. For example, the one or more batteries 530 may include a coin cell, prismatic, pouch, thin-film, or screen-printed battery. For example, as depicted in FIG. 5A, the one or more batteries 530 is a thin film battery. In this example, the thin film battery may be a commercially available thin-film MOLEX 13299-0002 battery, CP0042350 battery provided by RENATA BATTERIES, etc. In this regard, given the configuration of the tracking tag 500, this may allow for bending along the length of the tracking tag 500 as depicted in FIG. 6A as well as along the width of the tracking tag 500 as depicted in FIG. 6B.

Alternatively, coin cell batteries, such as CR2016, CR1216, CR1220, CR2012, etc. may be used. Coin cell batteries are typically used in powered badges and key cards and provided various benefits such as improved safety (e.g., because of a metal encased battery with reduced puncture danger as compared to thin-film batteries), higher capacity or rather longer life for extended runtime operations, lower costs, easier storage (for example, coin cell batteries usually slot into a battery holder and thus can be stored separately and installed closer to time of use which may also allow tracking tags to be stored in facilities not rated for battery storage whereas flatpack or other custom batteries are typically bonded to the device at manufacturing), lower lead times (e.g., for manufacture and availability), and so on.

In addition, although coin cell batteries do not bend, their smaller form factor may allow for lower stiffness in the tracking tag. In other words, the tracking tag may be more tolerant to bending at points away from the coin cell battery whereas for a thin-film battery, bending should be avoided in order to prevent damage to the thin-film battery which may have a larger form factor. The further the ridged portions are located away from one another and the PCB, the greater the amount of flexibility that can be achieved. In this regard, given the configuration of the tracking tag 500, bending along the length of the tracking tag 500 as depicted in FIG. 6A may be less desirable (e.g., likely to cause damage to the rigid components) than bending along the width of the tracking tag 500 as depicted in FIG. 6B.

The processor 540 may be configured the same or similarly to processors 110 and may include conventional processors, such as commercially available CPUs. For instance, the processor 540 may also include BLUETOOTH radio capabilities such as the NORDIC SEMICONDUCTOR nRF52832 or INPLAY IN100. In some instances, the processor 540 may actually comprise multiple processors that may or may not be stored within the same physical housing.

In some instances, the tracking tag may include a frame (not shown) to provide additional support to the tracking tag. For example, the frame may be formed from various materials such as polycarbonates or other plastics such as cellulose fiber (paper/wood), polyethylene (PE/LDPE/HDPE), polypropylene (PP), Vinyl (PVC), Nylon, Polyurethane (foam), rubber, silicone, resin, carbon fiber. The frame may be die-cut, molded or manufactured using other processes. The materials of the frame may be selected in order to enable the frame to be strong and puncture resistant while also flexible. In this regard, the frame may enable the tracking tag 500 to be attachable to objects (via the adhesive of the bottom layer 550) of various shapes including curved surfaces, such as depicted in FIGS. 6A and 6B.

Figure 5B:
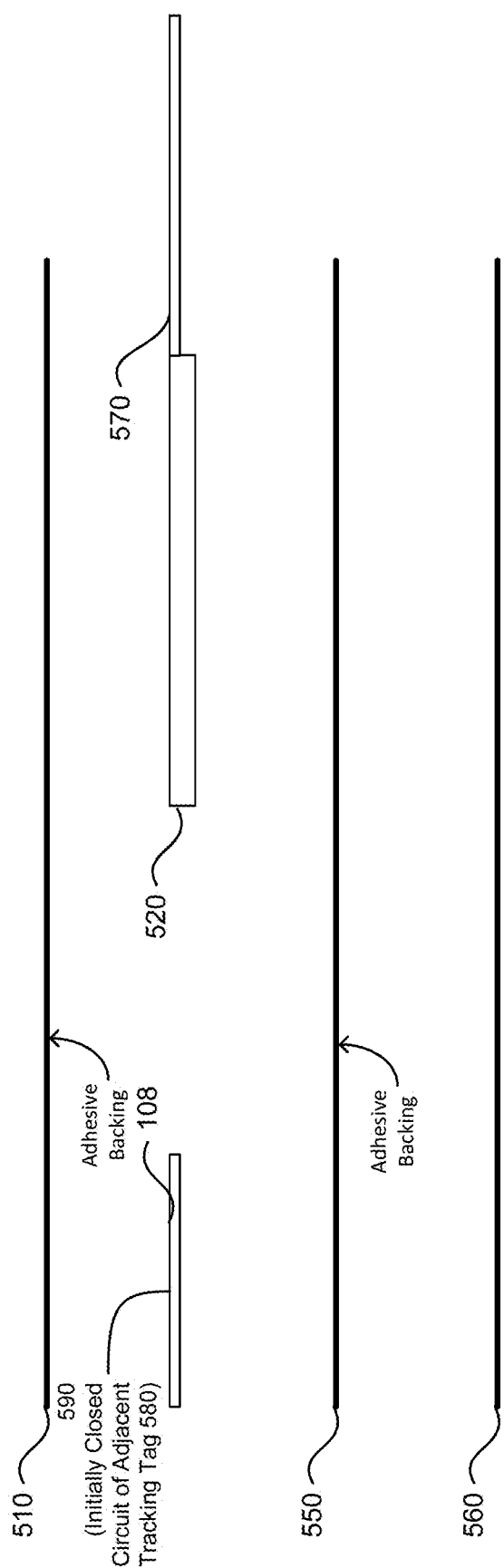

In some instances, a liner sheet or liner material, such as liner material 560 of FIGS. 5A, 5B, may be used to protect the adhesive before the tracking tag is attached to an object. The liner material 560 may allow adhering multiple labels to the liner material during manufacturing and may be either rolled or folded into one continuous strip of labels to feed into a printer. For instance, before using the tracking tag 500 may be attached to the liner material 560 such as craft or other paper to protect the adhesive on the bottom layer of the bottom surface before use. In such instances, the tracking tags may be provided on a roll which can be run through a printer to enable printing of information on the top layer of the tracking tags. In this regard, the tracking tags 500, 580, 582, 584 of FIG. 5A may represent a small portion of a larger roll which has been unrolled. Thus, a plurality of the tracking tags may be manufactured on a roll of the liner material 560, such as a waxed paper liner or other appropriate backing, which allows the tracking tags to be printed.

When in use, each tracking tag may be removed from an adjacent tracking tag. For example, one tracking tag may be removed (e.g., peeled off) of the roll of liner material and applied to an article to be shipped or another object by a human operator. In this regard, before applying the tracking tag 500 to an object, the tracking tag may be removed from the liner material in order to expose the adhesive on the bottom surface of the bottom layer. As noted above, the tracking may be printed on during manufacturing and/or by a human operator before removal from the liner material application of the tracking tag on an article to be shipped or another object. Thereafter the tracking tag 500 may be attached to the article to be shipped or another object.

The tracking tags may also include an activation mechanism configured to activate the tracking tag and initiate transmission of beacon signals by the beacon transmission circuitry. The initially closed circuit 570 may connect to the one or more batteries 530 (e.g., at a terminal) and the processor 540 in order to enable the processor to monitor the continuity of the closed circuit. The circuit 570 may also connect to ground or alternatively other pins of the processor to enable the same monitoring capabilities. The initially closed circuit may be formed from a conductive material such as foil tape such as a copper foil tape or by using embedded traces and inlay technology such as etched aluminum on polyethylene terephthalate (PET). The conductive material may extend beyond a perimeter of the top layer 510 of the tracking tag and may, at least before activation, be partially arranged under a second or an adjacent tracking tag 582 on the liner material 560.

The width of the conductive material may be at least 3 mm wide or more or less, or rather, wide enough to enable continuity and reliability of the copper foil in instances where the paper liner is perforated during manufacturing for instance to allow one or more tracking tags to be removed (e.g., torn) from the roll without being completely removed from the paper liner. In this regard, the exact dimensions of the material used may depend upon other characteristics of the tracking tag (such as dimensions, thickness, weight, etc.) as well as those of the paper liner (such as stiffness, etc.).

Figure 5C:
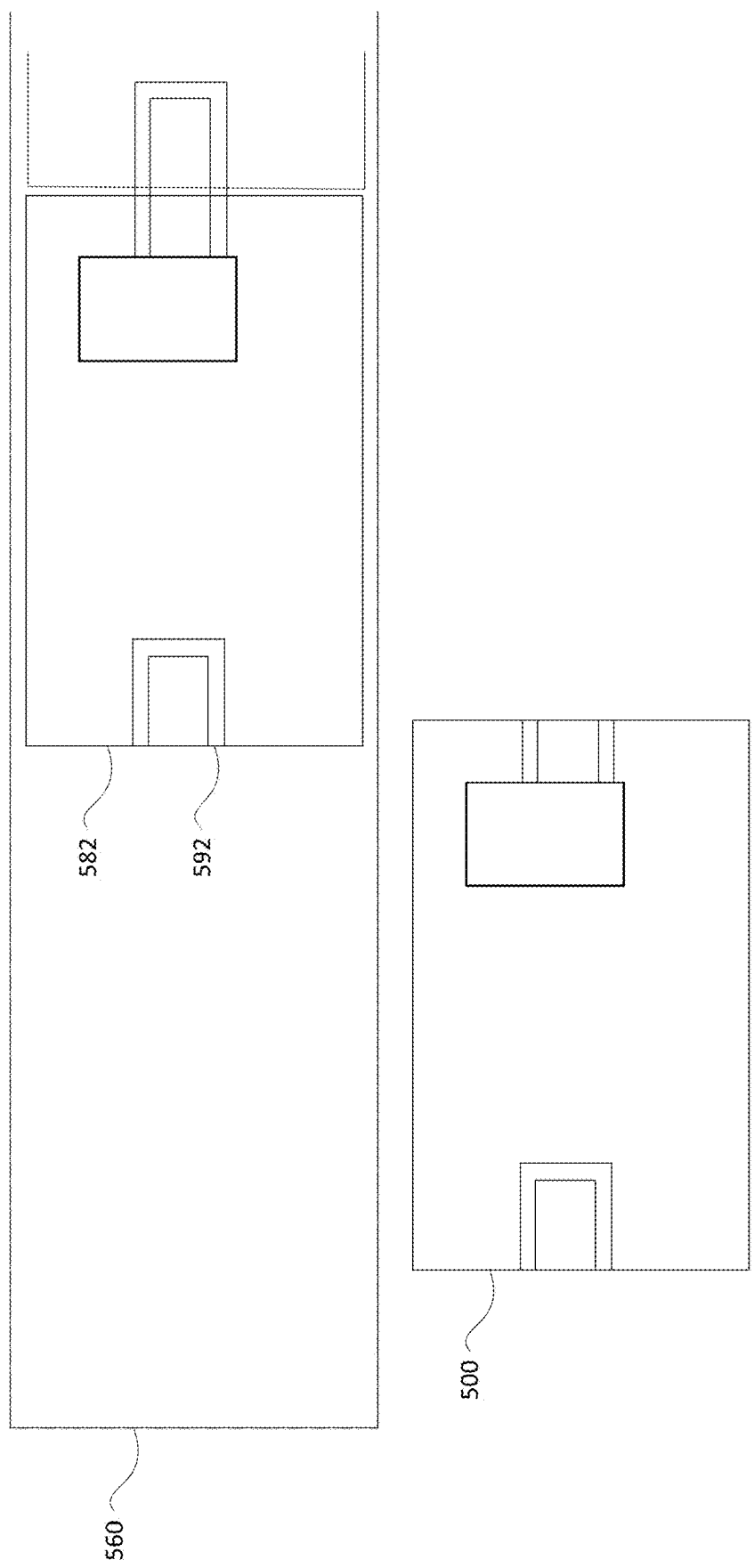

When the tracking tag 500 is removed (e.g., by peeling) from the liner paper of the roll, the continuity of the initially closed circuit is broken, activating the tracking tag and enabling the transmission of beacon signals which allow a tracking system to track the location of the tracking tag (as well as the article or another object to which the tracking tag is attached). This removal causes the tracking tag to be separated from both the liner material (e.g., a roll of liner material) as well as an adjacent racking tag as shown in FIG. 5C. In this regard, once the tracking tag 500 is removed, a portion of the initially closed circuit (depicted within the dash-line area 572 in FIG. 5A or as represented by portion 590 in FIGS. 5B, 5C), now no longer closed, may remain attached to the adjacent tracking tag 582.

In other instances, the tracking tag 500 and any other tracking tags may be initially arranged on a roll of liner material. However, rather than peeling the tracking tags from the liner material in order to separate adjacent tracking tags, adjacent tracking tags may be separated from one another by cutting, ripping or tearing the liner material between the two tracking tags. In this regard, the tracking tag 500 may be activated simply by cutting, ripping or tearing the liner material between the tracking tag 500 and an adjacent tracking tag (e.g., tracking tag 582). This cutting, ripping or tearing may function to also break the initially closed circuit between the two tracking tags as depicted with respect to tracking tags 500 and 582 in FIG. 5D. The cutting, ripping or tearing may occur immediately after printing the identifier information, for example, by pulling the liner material against a serrated metal edge in order to tear tracking tag 500 from tracking tag 582. In some instances, perforations may be added between the tracking tags in order to make the tearing easier. In this regard, once the tracking tag 500 is removed from the tracking tag 582, a portion of the initially closed circuit (represented by portion 590 in FIG. 5D), now no longer closed, may remain attached to the adjacent tracking tag 582. Thereafter, the portion of the liner material that is still attached to the tracking tag 500 may be removed in order to apply the tracking tag 500 to an object.

Figure 7B:
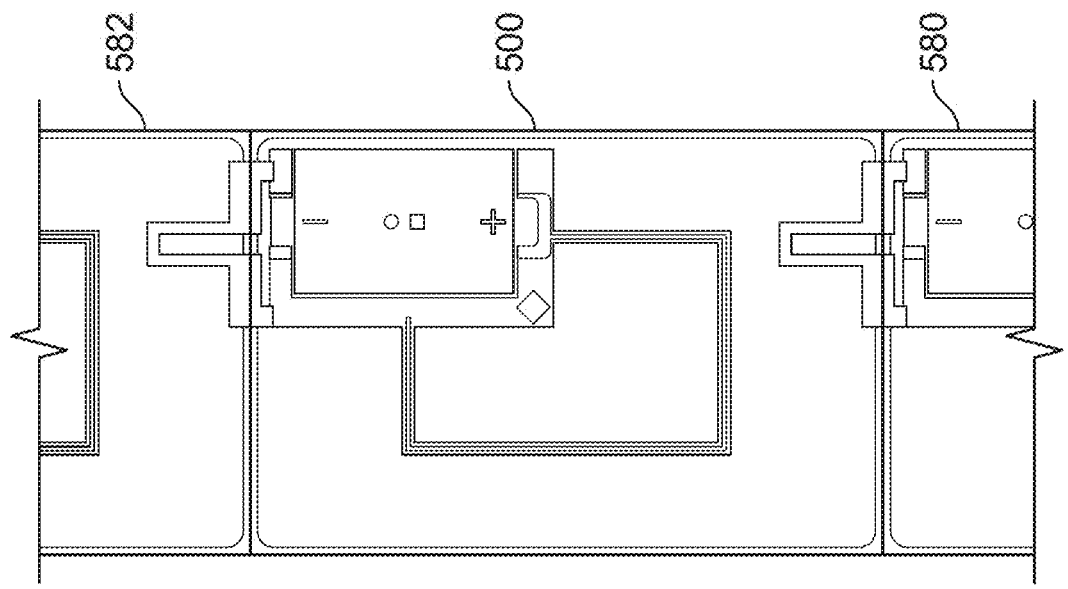
FIGS. 7A-B are example views of tracking tags in accordance with aspects of the disclosure.
Figure 7A:
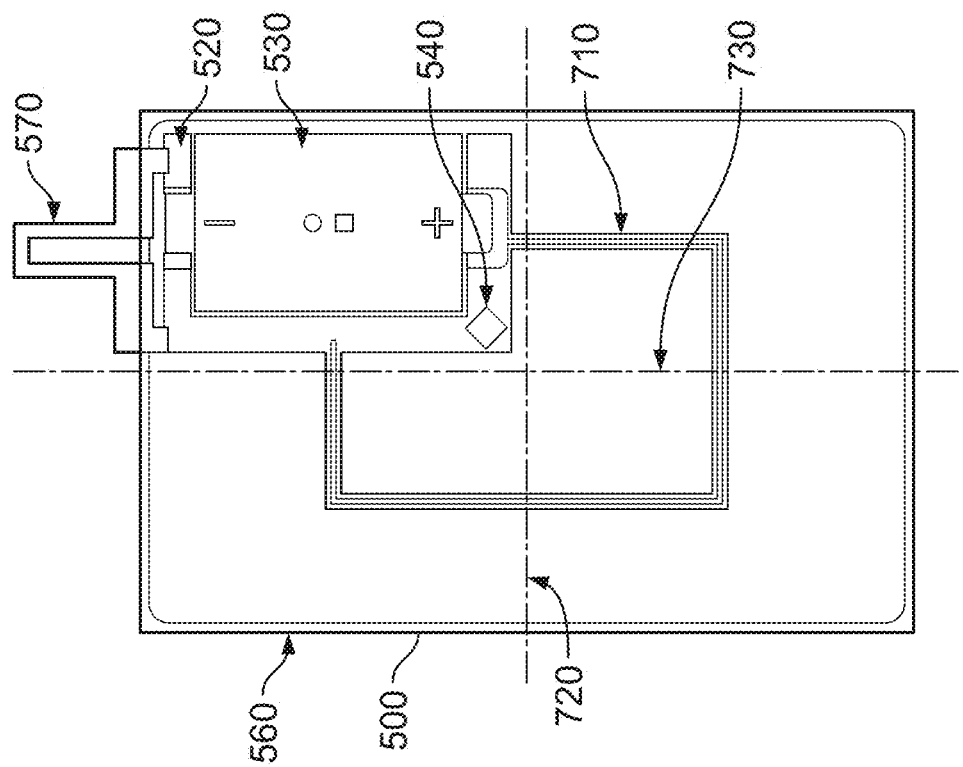

In some instances, the tracking tag may include a deactivation circuit. FIGS. 7A and 7B depict the tracking tag 500 with a deactivation circuit 710. FIG. 7B depicts the tracking tag 500 with the tracking tags 580, 582, each with corresponding deactivation circuits. The deactivation circuit 710 may connect the one or more batteries 530 (e.g., at a terminal). The deactivation circuit 710 may also connect to ground or alternatively other pins of the processor to enable the same monitoring capabilities. In this instance, when the deactivation circuit is broken, the tracking tag 500 may be deactivated or rather, no longer be able to send the aforementioned beacon signals. In other instances, when cut the deactivation circuit may send a signal to the processor 540 which indicates that the tracking process has ended. This, in turn, may cause the processor 540 to send a signal causing the tracking tag 500 to cease transmitting the beacon signals.

In either such instance, each tracking tag may further include one or more guidelines 720, 730 or other similar markings in order to enable a human operator, robot, or other mechanical device to generally align the guidelines at an opening of an article or a package between or at the meeting point of two flaps of a box. FIGS. 8A and 8B depict the tracking tag 500 arranged on a package 800, 810, respectively. In the example of FIG. 8A, the guidelines 730 are aligned with an opening 802 (e.g., between or at the meeting points of two flaps) of the package 800, and in the example of FIG. 8B, the guidelines 720 are aligned with an opening 812 of the package 810.

Once at its destination and the package 800, 810 is opened such as by cutting along the openings 802, 812 (e.g., through packing tape, not shown) and generally along the guidelines 720, 730, the act of cutting may also cut through the deactivation circuit 710. Alternatively, rather than cutting, the deactivation circuit 710 the deactivation circuit may otherwise be broken along the openings 802, 812. This cutting or otherwise breaking, in turn, may effectively deactivate the tracking tag as noted above.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5D:
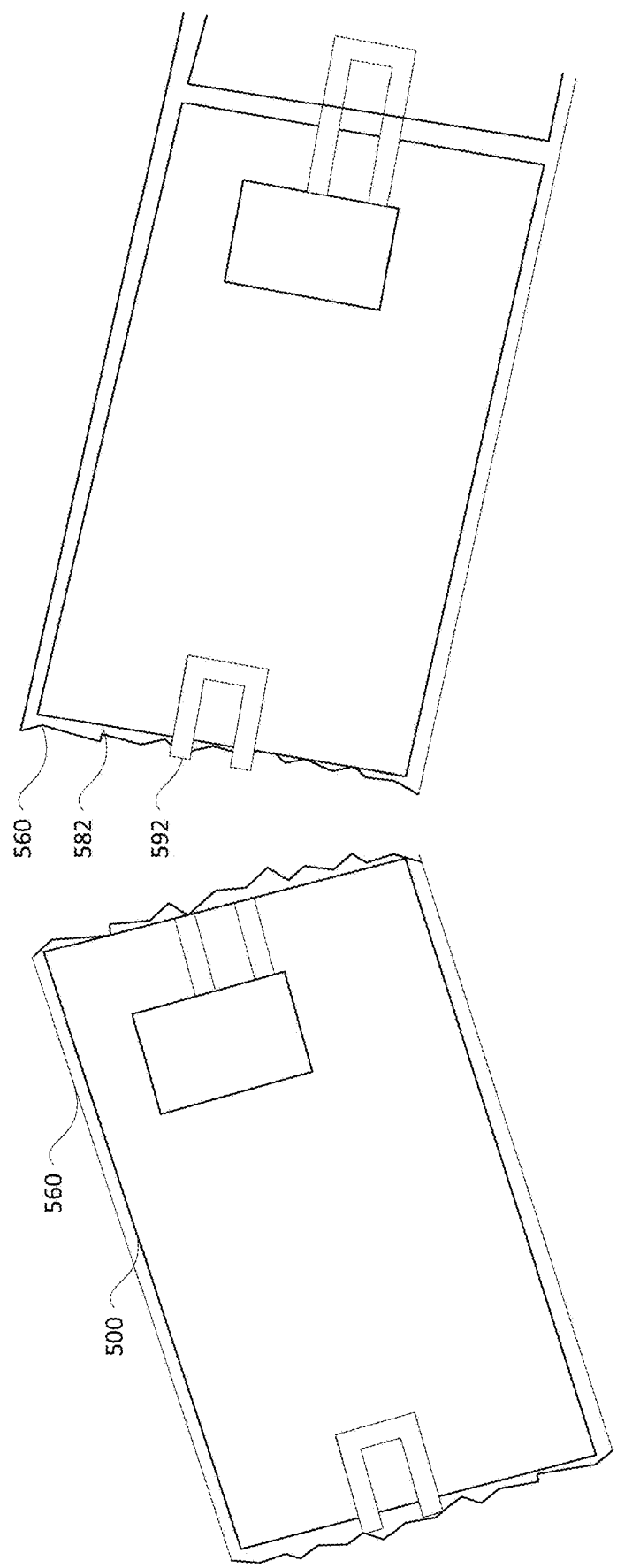
Figure 9:
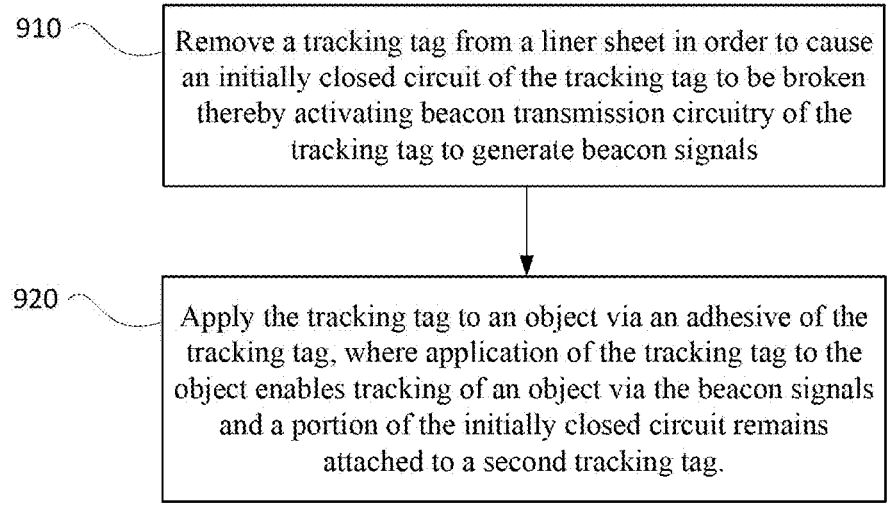
FIG. 9 is an example flow diagram in accordance with aspects of the disclosure.

FIG. 9 is an example flow diagram 900 depicting an example method for activating a tracking tag, such as a tracking tag 500, arranged on a liner material, such as liner material 560. Such a method may be performed by a human operator, robot or other mechanical device. At block 910, the tracking tag is removed from an adjacent tracking tag and the liner material. Removing the tracking tag causes an initially closed circuit of the tracking tag to be broken thereby activating beacon transmission circuitry of the tracking tag to generate beacon signals. This removal causes the tracking tag to be separated from an adjacent second tracking tag as depicted in FIGS. 5C and 5D. In this regard, a portion of the initially closed circuit remains attached to the second tracking tag.

As noted above, because the initially closed circuit 570 extends beyond a perimeter of the top layer 510 of the tracking tag 500, removing the tracking tag from the adjacent tracking tag results in a portion of the initially closed circuit remaining attached to the liner material (depicted within the dash-line area 572 in FIG. 5A or as represented by portion 590 in FIG. 5B). Thus, the liner material 560 may include a second tracking tag, such as the tracking tags 580, 582, 584, and the portion remains attached to the liner material between the second tracking tag and the liner material (depicted within the dash-line area 572 in FIG. 5A or as represented by portion 590 in FIGS. 5B, 5C). In this regard, the adhesive on the bottom layer of the second tracking tag may hold the portion of the initially closed circuit 570 to the liner material 560. In addition, the initially closed circuit 570 may include a material that is broken upon separation of the tracking tag 500 from adjacent tracking tag 582 which may also include the removal of the tracking tag from the liner material (as shown in FIG. 5C). The material may be wide enough to both allow the material to break and the second tracking tag to hold the portion of the initially closed circuit to the liner material 560.

At block 920, the tracking tag is applied to an object via an adhesive of the tracking tag. Application of the tracking tag 500 to the object, such as the packages 800, 810, enables tracking of the object via the beacon signals. For instance, the initially closed circuit 570 connects the one or more batteries 530 of the tracking tag to the processor 540 of the tracking tag, and removing the tracking tag from the liner material 560 enables the one or more batteries to power the processor as well as the beacon transmission circuitry 520. In response, the processor 540 may send a signal which activates the beacon transmission circuitry 520.

In some instances, the tracking tag 500 may also include a deactivation circuit 710. The activated beacon transmission circuitry 520 may thus be deactivated by cutting the deactivation circuit 710. For instance, the tracking tag 500 may be applied to a package, such as package 800, 810, using guidelines 720 or 730 on the top layer 510 of the tracking tag to align the tracking tag with the opening 802 or 812 of the package. In this regard, deactivating the activated beacon transmission circuitry 520 also includes cutting open the package. In some instances, cutting the deactivation circuit 710 causes the deactivation circuit to send a signal which indicates to the processor 540 of the tracking tag that the tracking process has ended. This, in turn, causes the processor to send a signal to the activated beacon transmission circuitry 520 which deactivates the activated beacon transmission circuitry and causes the tracking tag 500 to cease transmitting the beacon signals.

The features described herein may provide for a simple, cost effective and useful tracking tag which can be automatically activated without additional steps. For instance, logistics companies need not change existing shipping processes by adding additional steps in order to activate a tracking tag. Rather labels may be printed and applied to boxes or envelopes per usual and each tracking tag is automatically activated. Thus, the addition of the benefits of beacon-based tracking will not add additional labor costs. In addition, in many instances, this may prevent a human operator from inadvertently forgetting to activate a tracking tag.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same as or similarly elements.

The invention claimed is:

1. A system comprising:
 liner material; and
 a first tracking tag and a second tracking tag both at least initially arranged on the liner material, the first tracking tag and the second tracking tag including beacon transmission circuitry and a deactivation circuit configured to deactivate the beacon transmission circuitry when the deactivation circuit is cut, the beacon transmission circuitry including one or more batteries, a top layer, a bottom layer including an adhesive, and an activation mechanism configured to activate a respective one of the first or second tracking tag and cause the beacon transmission circuitry to transmit beacon signals in order to enable tracking of an object, wherein the activation mechanism includes an initially closed circuit that extends beyond a perimeter of the top layer, and wherein the activation mechanism of the first tracking tag is configured to automatically activate the first tracking tag when the first tracking tag is separated from the second tracking tag by peeling of the first tracking tag from the liner and breaking the initially closed circuit.

2. The system of claim 1, wherein the initially closed circuit of the first tracking tag includes a conductive material including a copper foil tape.

3. The system of claim 2, wherein the copper foil tape is at least 3 millimeters in width.

4. The system of claim 2, wherein the copper foil tape is perforated.

5. The system of claim 1, wherein the initially closed circuit of the first tracking tag connects the one or more batteries to a processor configured to activate the beacon transmission circuitry when the initially closed circuit of the first tracking tag is broken.

6. The system of claim 1, wherein the initially closed circuit of the first tracking tag is configured such that breaking the initially closed circuit of the first tracking tag activates the first tracking tag and causes the beacon transmission circuitry to transmit the beacon signals.

7. The system of claim 1, wherein the initially closed circuit of the first tracking tag is arranged at least partially between the second tracking tag and the liner material.

8. The system of claim 7, wherein the initially closed circuit of the first tracking tag is configured such that removing the first tracking tag from the liner material causes the initially closed circuit of the first tracking tag to be broken, and wherein a portion of the initially closed circuit of the first tracking tag remains attached to the second tracking tag.

9. The system of claim 1, wherein the first tracking tag further includes guidelines on the top layer for aligning the first tracking tag with an opening of a package, and wherein the guidelines are arranged such that by cutting along the guidelines will cut the deactivation circuit.

10. A method for activating a first tracking tag arranged on a liner material, the method comprising:
 removing the first tracking tag from a second tracking tag on the liner material by peeling the first tracking tag away from the liner material and breaking an initially closed circuit, wherein peeling the first tracking tag from the second tracking tag causes the initially closed circuit of the first tracking tag to be broken thereby activating first beacon transmission circuitry of the first tracking tag to generate beacon signals and a portion of the initially closed circuit remains attached to the second tracking tag; and
 deactivating the first beacon transmission circuitry of the first tracking tag by cutting or otherwise breaking a deactivation circuit of the first tracking tag,
 wherein the second tracking tag includes second beacon transmission circuitry configured to generate beacon signal when activated.

11. The method of claim 10, further comprising applying the first tracking tag to an object via an adhesive of the first tracking tag, wherein application of the first tracking tag to the object enables tracking of the object via the beacon signals.

12. The method of claim 10, wherein the portion of the initially closed circuit extends beyond a perimeter of a top layer of the first tracking tag, such that separating the first tracking tag from the second tracking tag results in the portion of the initially closed circuit remaining attached to the liner material.

13. The method of claim 10, wherein the portion remains attached to the liner material between the second tracking tag and the liner material.

14. The method of claim 10, wherein the initially closed circuit includes a conductive material including copper foil tape that is broken upon removal of the first tracking tag from the liner material.

15. The method of claim 10, wherein the initially closed circuit connects one or more batteries of the first tracking tag to a processor of the first tracking tag, and wherein separating the first tracking tag from the second tracking tag enables the one or more batteries to power the processor.

16. The method of claim 10, further comprising applying the first tracking tag to a package using guidelines on a top layer of the first tracking tag to align the first tracking tag with an opening of the package.

17. The method of claim 16, wherein deactivating the first beacon transmission circuitry of the first tracking tag includes cutting open the package.

18. The method of claim 10, wherein cutting or otherwise breaking the deactivation circuit causes a signal to be sent to a processor of the first tracking tag which, in turn, causes the processor to send a signal to the first beacon transmission circuitry of the first tracking tag which causes the first tracking tag to cease transmitting the beacon signals.

* * * * *

UNITED STATES PATENT AND TRADEMARK OFFICE
CERTIFICATE OF CORRECTION

PATENT NO. : 12,393,812 B2  
APPLICATION NO. : 18/235123  
DATED : August 19, 2025  
INVENTOR(S) : Shane Washburn et al.

Page 1 of 1

It is certified that error appears in the above-identified patent and that said Letters Patent is hereby corrected as shown below:

On the Title Page

Item (71) Now reads: "X Development LLC, Mountain View, CA (US)" should read
-- CHORUSVIEW, INC., Las Vegas, NV (US) --

Signed and Sealed this
Seventh Day of October, 2025

John A. Squires
*Director of the United States Patent and Trademark Office*